(12) United States Patent
Belluomini et al.

(10) Patent No.: US 8,639,883 B2
(45) Date of Patent: *Jan. 28, 2014

(54) REDUCING WRITE AMPLIFICATION IN A CACHE WITH FLASH MEMORY USED AS A WRITE CACHE

(71) Applicant: International Business Machines Corporation, Armonk, NY (US)

(72) Inventors: Wendy A. Belluomini, San Jose, CA (US); Binny S. Gill, San Jose, CA (US); Michael A. Ko, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,171

(22) Filed: Jan. 15, 2013

(65) Prior Publication Data

US 2013/0132655 A1    May 23, 2013

Related U.S. Application Data

(63) Continuation of application No. 12/826,499, filed on Jun. 29, 2010, now Pat. No. 8,386,714.

(51) Int. Cl.
    *G06F 13/00* (2006.01)
(52) U.S. Cl.
    USPC ............................ 711/129; 711/165; 711/170
(58) Field of Classification Search
    USPC .......... 711/103, 129, 162, 165, 170, E12.046, 711/E12.008
    See application file for complete search history.

(56) References Cited

U.S. PATENT DOCUMENTS

| 7,404,029 | B2 | 7/2008 | Nakamura et al. | |
|---|---|---|---|---|
| 8,046,551 | B1 * | 10/2011 | Sahin | 711/162 |
| 8,386,714 | B2 * | 2/2013 | Belluomini et al. | 711/118 |
| 2007/0143560 | A1 * | 6/2007 | Gorobets | 711/170 |
| 2008/0071970 | A1 | 3/2008 | Lin | |
| 2008/0307192 | A1 | 12/2008 | Sinclair et al. | |
| 2010/0293337 | A1 * | 11/2010 | Murphy et al. | 711/136 |
| 2011/0093648 | A1 | 4/2011 | Belluomini et al. | |

OTHER PUBLICATIONS

Luc Bouganim et al., "uFLIP: Understanding Flash IO Patterns", 4th Biennial Conference on Innovative Data Systems Research (CIDR), Jan. 2009, Asilomar, California, 12 pages.

* cited by examiner

*Primary Examiner* — Tuan Thai
*Assistant Examiner* — Zhuo Li
(74) *Attorney, Agent, or Firm* — Mohammed Kashef

(57) ABSTRACT

Embodiments of the invention are directed to reducing write amplification in a cache with flash memory used as a write cache. An embodiment of the invention includes partitioning at least one flash memory device in the cache into a plurality of logical partitions. Each of the plurality of logical partitions is a logical subdivision of one of the at least one flash memory device and comprises a plurality of memory pages. Data are buffered in a buffer. The data includes data to be cached, and data to be destaged from the cache to a storage subsystem. Data to be cached are written from the buffer to the at least one flash memory device. A processor coupled to the buffer is provided with access to the data written to the at least one flash memory device from the buffer, and a location of the data written to the at least one flash memory device within the plurality of logical partitions. The data written to the at least one flash memory device are destaged from the buffer to the storage subsystem.

16 Claims, 4 Drawing Sheets

REDUCING WRITE AMPLIFICATION IN A CACHE WITH FLASH MEMORY USED AS A WRITE CACHE

This application is a continuation of U.S. patent application Ser. No. 12/826,499 filed Jun. 29, 2010, which is herein incorporated by reference.

BACKGROUND

Embodiments of the invention relate to memory devices, and in particular, to reducing write amplification in a cache with flash memory used as a write cache.

A cache is a small, high-speed memory device interposed between a processor and a larger but slower device, such as main memory or storage. Caches temporarily store data that are frequently accessed by applications executing on a processor. Data typically reside in a cache after an initial access to data from main memory or storage. Subsequent accesses to the same data are made to the cache. A cache allows for the data to be accessed in a shorter amount of time by reducing the number of wait states during data accesses.

Flash memory is a type of non-volatile memory that has low power and high-density. In particular, flash memory is a type of Electrically Erasable Programmable Read Only Memory (EEPROM) device that can be electrically erased and reprogrammed in blocks. Flash memory has features of the Random Access Memory (RAM) because data are rewritable on flash memory. Flash memory also has features of Read Only Memory (ROM) because flash memory devices are non-volatile. Memory cells are arranged in blocks for erasure, and after a block has been erased, the block is available to be reprogrammed. Flash memory has become an increasingly popular form of non-volatile memory because of the flash memory's small size, fast access speeds, shock resistance, and light weight.

Write amplification is a process that occurs when data are written to solid-state memory arrays. A memory array scans for free space in the memory array, when data are written to the array. Free space in a memory array includes individual cells, pages, and/or blocks of memory cells that are not programmed. Data are written to free space in the memory array, if there is enough free space to write the data. The data in a memory array is rearranged, if there is not enough free space in one location. Data in a memory array is rearranged by erasing, moving, and rewriting the data to a new location within the same memory array. Garbage collection is the process of identifying blocks with valid data for erasure and relocation.

Write amplification is the process of rearranging old data in a memory array. Rearrangement of data leaves free space for new data that is to be written in the memory array. The amount of write operations memory arrays must do in order to write new data are amplified based upon the amount of free space in the memory array and the size of the new data that is to be written on the memory array. Write amplification can be reduced by an increase in the amount of space on a memory array designated as free space, because less data will have to be rearranged. Performance of flash memory degrades, as a substitute or a supplement to DRAM in a cache, as a result of write amplification because write locations are random in typical caching environments.

BRIEF SUMMARY

Preferred embodiments of the invention relate to reducing write amplification in a cache with flash memory used as a write cache. An aspect of the invention is a cache. The cache includes a buffer that buffers data to be cached and data to be destaged from cache to a storage subsystem. The cache further includes at least one flash memory device coupled to the buffer. The at least one flash memory device comprises a plurality of logical partitions. Each of the plurality of logical partitions is a logical subdivision of one of the at least one flash memory device and comprises a plurality of pages. The at least one flash memory device caches the data to be cached from the buffer. The cached data in the buffer and a location of the cached data within the plurality of logical partitions are accessible by a processor.

Another aspect of the invention includes a method for reducing write amplification in a cache with flash memory used as a write cache. The method includes partitioning at least one flash memory device in a cache into a plurality of logical partitions. Each of the plurality of logical partitions is a logical subdivision of one of the at least one flash memory device and comprises a plurality of pages. The method further includes buffering data in a buffer. The buffer buffers data to be cached and data to be destaged from the cache to a storage subsystem. The method further includes writing the data to be cached from the buffer to the at least one flash memory device. The method further includes providing a processor coupled to the buffer with access to the data written to the at least one flash memory device from the buffer and a location of the data written to the at least one flash memory device within the plurality of logical partitions. The method further includes destaging the data written to the at least one flash memory device from the buffer to the storage subsystem.

Another aspect of the invention includes a computer program product for reducing write amplification in a cache with flash memory used as a write cache. The computer program product includes a computer readable storage medium having computer readable program code embodied therewith. The computer readable program code includes computer readable program code to partition at least one flash memory device in a cache into a plurality of logical partitions. Each of the plurality of logical partitions is a logical subdivision of one of the at least one flash memory device and comprises a plurality of pages. The computer readable program code further includes computer readable program code to buffer data in a buffer. The data buffered is data to be cached and data to be destaged from the cache to a storage subsystem. The computer readable program code further includes computer readable program code to write the data to be cached from the buffer to a flash memory device. The computer readable program code further includes computer readable program code to provide a processor coupled to the buffer with access to the data written to the at least one flash memory device from the buffer and with a location of the data written to the at least one flash memory device within the plurality of logical partitions. The computer readable program code further includes computer readable program code to destage the data from the at least one flash memory device to the storage subsystem.

These and other, features, aspects, and advantages of the present invention will be apparent with reference to the following detailed description and appended claims.

DETAILED DESCRIPTION

Embodiments of the invention are directed to reducing write amplification in a cache with flash memory used as a write cache for storage devices with a write-in-place restriction. According to embodiments of the invention, a flash memory device used as write cache in a cache is divided into a plurality of logical partitions (i.e., partitions=N). The logical partitions are arranged in a circular ring. The logical partitions include one or more logical partition to receive writes and one or more logical partitions that destage modified data to storage. In an alternate embodiment, the flash memory device further includes one or more logical partitions that contain data already destaged. In another alternate embodiment, the flash memory device further includes one or more logical partitions that contain modified data, which needs to be destaged.

In an exemplary embodiment, new data are written into one of the plurality of logical partitions and destaged from another one of the plurality of logical partitions concurrently. A writing pointer and a destaging pointer move sequentially, in chronological order, through the plurality of logical partitions in the circular ring. For example, writing new data sequentially in chronological order takes advantage of the highest throughput available in flash memory for sequential writes. The writing pointer moves forward to the next previously destaged logical partition in the circular ring after the previous writing partition has reached memory capacity. The destaging pointer moves forward to the next logical partition in the circular ring after all data in the current destaging partition have been destaged.

In another exemplary embodiment, write data with high hit ratios are written back in the current writing partition. The flash memory controller erases all blocks from a logical partition from which data were destaged from. As a result, the flash memory device will be fully utilized without having to reserve memory pages for garbage collection purposes to reduce write amplification, thereby achieving high throughput.

Figure 1:
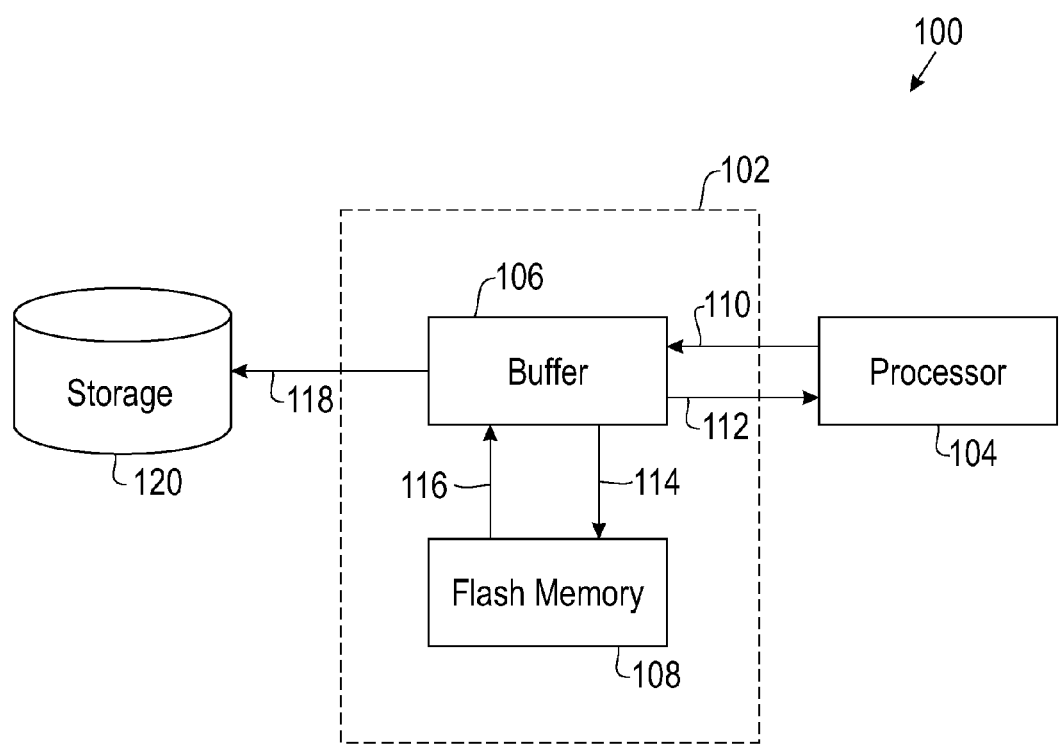
FIG. 1 is a diagram of a system with a cache using flash memory as a write cache, according to one embodiment.

Referring now to FIG. 1, there is a diagram of a system 100 with a cache 102 using flash memory 108 as a write cache. The cache 102 comprises a buffer 106 and a flash memory device 108. The buffer 106 is configured to write data 114 to the flash memory device 108. The buffer 106 is further configured to read data 116 from the flash memory device 108 that is to be destaged to storage subsystem 120. The cache 102 is further coupled to a processor 104. The processor 104 writes data 110 to be cached in cache 102 to the buffer 106. The processor 104 also reads data 112 that are cached in cache 102 for use by the processor 104 from the buffer 106. The cache 102 is further coupled to a storage subsystem 120. The buffer writes data 118 to be stored to the storage subsystem 120.

Figure 2:
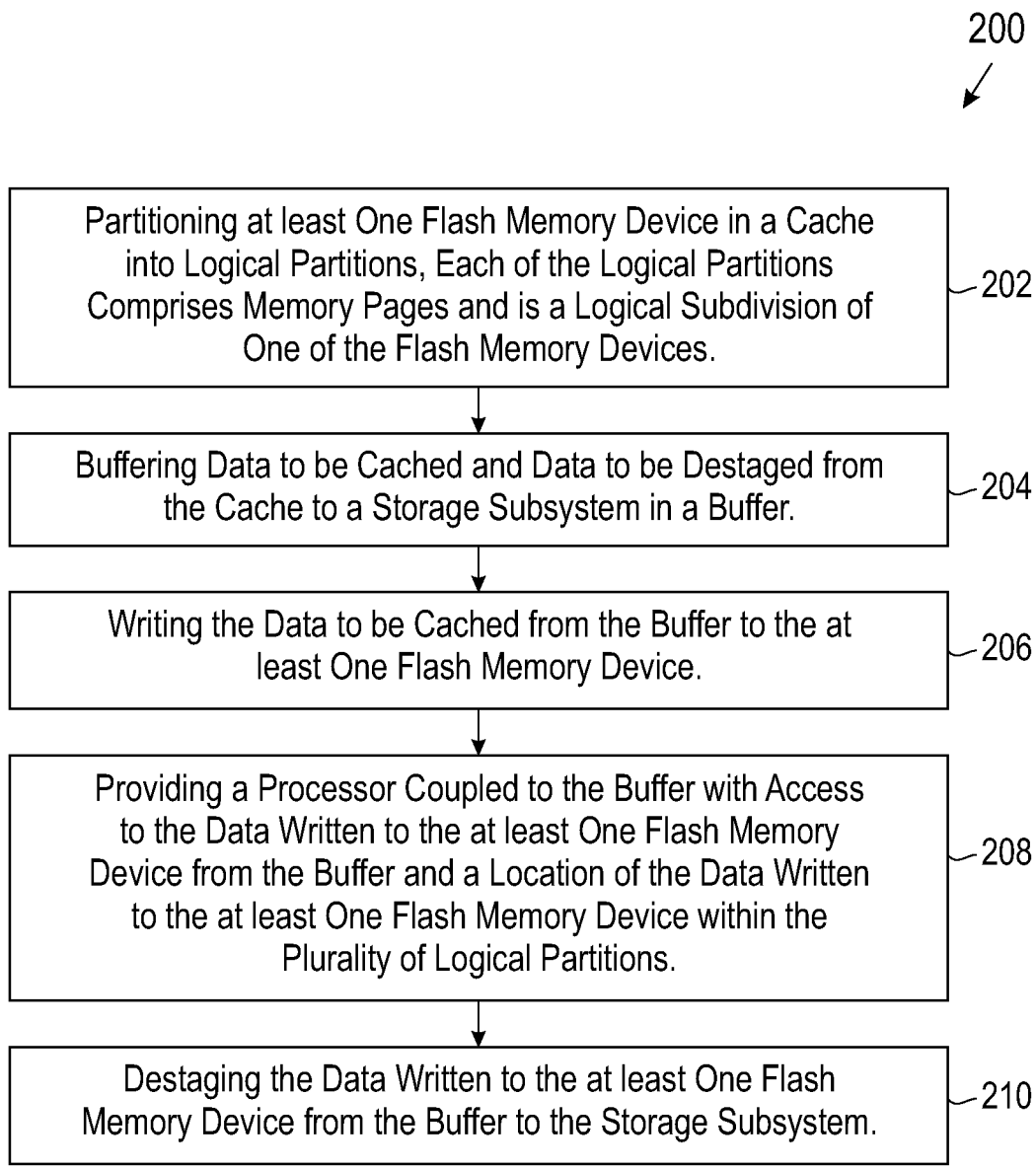
FIG. 2 is a flow chart of a method for reducing write amplification in a cache using flash memory as a write cache, according to one embodiment.

FIG. 2 is a flow chart of a method 200 for reducing write amplification in a cache 102 using flash memory 108 as a write cache, according to one embodiment. In step 202, at least one flash memory device 108 in a cache 102 is partitioned into a plurality of logical partitions. In an exemplary embodiment, the flash memory device 108 is divided into a plurality of logical partitions (e.g., plurality of logical partitions=N). The flash memory device 108 in cache 102 is partitioned into a plurality of logical partitions to reduce the possibility that a partition, to be written to, is currently busy destaging data. For example, only a small subset of modified data in the flash memory device has to be destaged, which allows for quickly destaging a new logical partition and making it available for new writes. In a preferred embodiment, the plurality of logical partitions are arranged in a circular ring.

According to an embodiment of the invention, each of the plurality of logical partitions corresponds to a plurality of memory pages in the at least one flash memory device 108. For example, each of the logical partitions comprises part of at least one memory page that is a logical subdivision of one of the flash memory devices 108. In one embodiment, the plurality of logical partitions is defined by the processor 104. In another embodiment, the plurality of logical partitions is defined by the flash memory device 108. Each of the plurality of logical partitions is not a contiguous space in the at least one flash memory device 108. For example, the plurality of logical partitions may comprise any collection of memory pages (e.g., collection of flash memory blocks) on the at least one flash memory device 108 with a guarantee that aligned writes that completely overwrite an entire logical partition will not result in write amplification.

In one embodiment, the plurality of logical partitions includes at least two logical partitions of flash memory device 108 (i.e., N=2). The two logical partitions include a write partition and a destage partition. The write partition is for writing data 114 from buffer 106 to the flash memory device 108. The destage partition is for reading data 116 from flash memory device 108 to the buffer 106, which is to be destaged to storage subsystem 108.

In an alternate embodiment, there are four types of logical partitions (i.e., N≥4). The four types of logical partitions include a write partition, a destage partition, a partition with data already destaged, and a partition with modified data that need to be destaged. The logical partition with data already destaged contains data previously destaged to storage subsystem 120 and other unmodified data. For example, the logical partition with modified data contains data that have been modified since previously being destaged to storage subsystem 120.

In a preferred embodiment, the flash memory device 108 is partitioned into six logical partitions (i.e., N=6) comprising the four types of logical partitions. In another preferred embodiment, the six logical partitions include one write partition, one destage partition, two partitions with data already destaged, and two partitions with modified data that need to be destaged. In another embodiment, the flash memory device 108 is partitioned into four logical partitions (i.e., N=4) comprising the four types of logical partitions. For example, the four logical partitions include one write partition, one destage partition, one partition with data already destaged, and one partition with modified data that need to be destaged.

In step 204, data to be cached from the processor 104 and data to be destaged from the cache 102 to the storage subsystem 106 are buffered in buffer 106. In one embodiment, data from processor 104 being cached are written 114 to flash memory device 108 from buffer 106. In another embodiment, data being destaged to storage subsystem 120 are read 116 from flash memory device 108 by buffer 106.

In one embodiment, data to be destaged 118 to the storage subsystem 120 are read 116 by the buffer 106 from the plurality of logical partitions sequentially. In an exemplary embodiment, the destage pointer moves forward to the next previously written logical partition, after all data in the current destaging logical partition have been destaged 118 to storage subsystem 120 or relocated to the current writing partition. In another exemplary embodiment, a controller of the flash memory device 108 erases memory pages that were destaged to storage subsystem 120 without garbage collection, which avoids write amplification.

In an alternative embodiment, one or more logical partitions are selected to be read 116 by the buffer 106 for destaging data to the subsystem 120 based on the data stored in the one or more logical partitions. In one embodiment, the logical partitions are selected for destaging data 118 in an order that begins from a logical partition having the least amount of modified data and ends with a logical partition having the most modified data. In a second embodiment, the logical partitions are selected for destaging data 118 in an order that begins from a logical partition having the least amount of data repeatedly accessed by the processor 104 and ends with a logical partition with the most data repeatedly accessed by the processor 104. In a third embodiment, the logical partitions are selected for destaging data 118 in an order that begins from a logical partition having the least amount of valid data and ends with a logical partition having the most valid data.

In another alternate embodiment, data to be destaged 118 to the storage subsystem 120 are read 116 from at least one of the plurality of logical partitions by the buffer 106 in a LBA order. The cache 102 searches the plurality of logical partitions for adjacent LBAs during the destage 118 process such that all data with contiguous LBAs can be destaged 118 at once, which optimizes disk scheduling. For example, modified pages in at least one of the plurality of logical partitions that are consecutive to pages being destaged in at least another one of the plurality of logical partitions are read 116 by the buffer 106 concurrently. Concurrently refers to a point-in-time that is operated or occurring at the same time simultaneously, with an intersect point, with an overlap point, in parallel, or in conjunction.

In a first embodiment, data are destaged 118 to the storage subsystem 120 from at least one of the plurality of logical partitions by the buffer 106 in a LBA order that begins from a logical partition with data being oldest and ends with a logical partition with data being newest. In a second embodiment, data are destaged 118 to the storage subsystem 120 from at least one of the plurality of logical partitions by the buffer 106 in a LBA order that begins from a logical partition with the least amount of valid data and ends with a logical partition having the most valid data. In a third embodiment, data are destaged 118 to the storage subsystem 120 from at least one of the plurality of logical partitions by the buffer 106 in a LBA order that begins from a logical partition with a least amount of modified data and ends with a logical partition having the most of modified data. In a fourth embodiment, data are destaged 118 to the storage subsystem 120 from at least one of the plurality of logical partitions by the buffer 106 in a LBA order begins from a logical partition with the least amount of data repeatedly accessed by the processor and ends with a logical partition having the most data repeatedly accessed by the processor.

In step 206, data to be cached from the processor 104 are written 114 to the at least one flash memory device 108 by the buffer 106. In one embodiment, data to be cached to the flash memory device 108 are written to a single logical partition of the plurality of logical partitions until the single logical partition has reached a pre-determined limit. For example, the pre-determined limit may be in the range ifrom 75% capacity to 100% capacity. In a preferred embodiment, the pre-determined limit is the full capacity, 100% capacity, of the logical partition because there is no need to reserve memory for garbage collection. Therefore, write amplification is eliminated without the need to reserve memory space for garbage collection, when the pre-determined limit is full capacity.

In one embodiment, data to be cached to the flash memory device 108 are written 114 to the plurality of logical partitions in a sequential order of the plurality of logical partitions. In an alternate embodiment, data to be cached to the flash memory device 108 are written 114 to the plurality of logical partitions in an order that begins from a logical partition having a least amount of modified data and ends with a logical partition having the most modified data. In another alternate embodiment, data to be cached to the flash memory device 108 are written 114 to the plurality of logical partitions in an order that begins from a logical partition having a least amount of data repeatedly accessed by the processor and ends with a logical partition having the most data repeatedly accessed by the processor. In another alternate embodiment, data to be cached to the flash memory device 108 are written 114 to the plurality of logical partitions in an order that begins from a logical partition having a least amount of valid data and ends with a logical partition having the most valid data.

In step 208, the processor 104 is provided with access to data written 114 from the buffer 106 to the at least one flash memory device 108 and with a location of the data written 114 to the at least one flash memory device 108 within the plurality of logical partitions.

In step 210, data written to the at least one flash memory device 108 are destaged 118 from the buffer 106 to the storage subsystem 120. In one embodiment, data to be destaged 118 are read 116 by the buffer 106 from a single logical partition of the plurality of logical partitions until at least all modified data in the single logical partition have been read 116. For example, a module within the processor 104 is responsible for directing data to be destaged 118.

In one embodiment, the buffer 106 destages 118 modified pages in at least one of the plurality of logical partitions that are consecutive to pages being destaged 118 in another one of the plurality of logical partitions to the storage subsystem 120 concurrently. The logical partition may be made available for erasure and writing 114 new data to be cached to the at least one flash memory device 108 when all modified data in the logical partition has been read 116 by the buffer 106 and destaged 118 to the storage subsystem 120.

In an alternate embodiment, the buffer 108 destages data from a logical partition with blocks of memory pages that have the least amount of useful data. "Useful data" refers to any modified data or any unmodified data that have received repeated hits by the processor 104 from cache 102. For example, new writes cannot blindly erase and overwrite blocks of memory pages on the at least one flash memory device 108, rather the cache 102 has to first determine if the block has any useful data or not. The flash memory device 108 first selects blocks of memory pages which have the least amount of useful data. The writing partition then copies the selected blocks of memory pages to a logical partition with newer blocks of memory pages and erases the migrated blocks from the originating partition for reuse.

In a second alternate embodiment, data are destaged from blocks of memory pages randomly, from a logical partition being read 116 by buffer 106. For example, blocks of memory pages can be selected in random fashion using any caching algorithm.

In a third alternate embodiment, data are destaged from older blocks of memory pages in the one or more destaging partitions being read 116 by buffer 106. The age of all memory pages in a single block are the same because the block is written all at once. For example, destaging data 118 to storage subsystem 120 is focused on a smaller subset of blocks of memory pages, which creates more blocks that can be overwritten without incurring large amounts of write amplification. The age of the blocks of memory pages targeted are dynamically adjusted according to the write amplification being incurred. In one embodiment, a destager will restrict itself to older pages, if the write amplification needs to be lowered. In another embodiment, the destager will start targeting some younger pages as well, if the write amplification is lower than allowable.

In a fourth alternate embodiment, the flash memory device 108 copies data that have been accessed by the processor 104 at least once, preferably at least twice, from a first logical partition of the plurality of logical partitions to a second logical partition of the plurality of logical partitions. The first logical partition is also read 116 for data to be destaged 118 by the current destaging partition. The second logical partition also receives writes 114 of data to be cached from the buffer 106 to the flash memory device 108 from the current writing partition.

In a preferred embodiment, data are destaged 118 to the storage subsystem 120 at a varying rate. For example, destaging data 118 at a varying rate ensures sufficient space is available for writing new data to be cached to the flash memory device 108. In one embodiment, the average rate of reading data to be destaged 116 is equal to the average rate of writing 114 to avoid overrunning the cache 102. For example, destaging at a rate faster than the writing rate is undesirable because the amount of time a modified page stays in the write cache is shorter, which decreases the write cache size.

In another embodiment, the rate of reading data 116 to be destaged 118 is a fixed amount ahead of the writing process. For example, when the partition being written 114 to is full, the next partition will have already been read 116 for destaging data 118 to storage subsystem 120. Reading data 116 to be destaged 118 from a current destaging partition requires the highest priority to prevent the writing 114 rate exceeding the reading rate 116 of data to be destaged. Accordingly, the number of logical partitions used (i.e., N), is dependent on the difference between the anticipated writing rate 114 versus the average read 116 rate for data to be destaged 118 to storage subsystem 120.

In one embodiment, cache 102 comprises at least two flash memory devices 108. Data to be cached from buffer 106 are written 114 to the at least two flash memory devices 108 in parallel, while maintaining sequential writes 114 to the plurality of logical partitions. Data to be destaged 118 are read 116 from the at least two flash memory device 108 in parallel, while maintaining sequential reading 116 of the plurality of logical partitions.

In another embodiment, the plurality of logical partitions comprises at least two circular rings. For example, each circular ring comprises a plurality of logical partitions, where each ring may comprise a different number of logical partitions. In one embodiment, data are written 114 to each circular ring in parallel and read 116 from each circular ring in parallel. For example, higher throughput is achieved by being able to write data 114 to each of the at least two circular rings in parallel and read data 116 to be destaged 118 in parallel.

In another embodiment, the flash memory device 108 comprises a single logical partition. In an exemplary embodiment, a read cache is merged with the write cache on a single flash memory device 108 by incorporating the blocks of memory pages that get repeated hits as useful pages in the write cache. For example, cache 108 comprises one logical partition which is both the write cache with modified data and the read cache with unmodified data.

Figure 3:
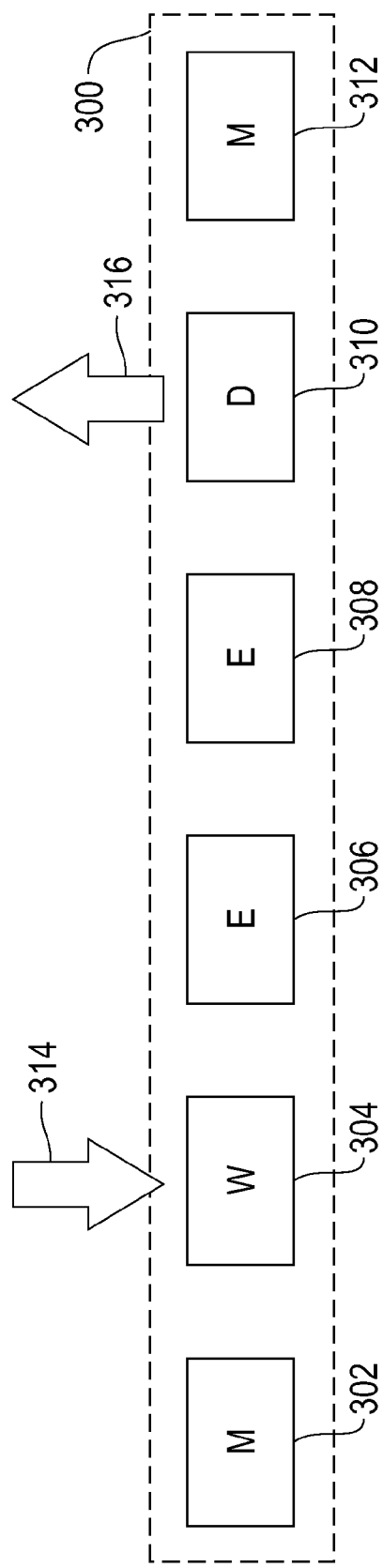
FIG. 3 illustrates logical partitions of the flash memory device shown in FIG. 1, according to one embodiment.

FIG. 3 illustrates logical partitions 300 of the flash memory device 108 shown in FIG. 1, according to one embodiment. The flash memory device 108 is partitioned into a plurality of logical partitions 300. The plurality of logical partitions 300 includes six logical partitions. For example, depending on number of logical partitions, there can be zero, one or more previously destaged partitions, and zero, one or more previously written partitions. The plurality of logical partitions 300 are arranged in a circular fashion, with new data being written in one logical partition 304 and previously written data being read for destaging from another logical partition 310. The plurality of logical partitions 300 are read from and written to in sequential order.

The plurality of logical partitions 300 includes a partition (M) 302 that contains modified data to be destaged from the flash memory device 108 to storage subsystem 120. The plurality of logical partitions 300 further includes a partition (W) 304 that actively receives writes of data from the processor 104. The data are written from the buffer 106 to the flash memory device 108. The plurality of logical partitions 300 further includes two partitions (E) 306 and 308, which contain data that have already been destaged from buffer 106 to storage subsystem 120. The plurality of logical partitions 300 further includes a partition (D) 310 that actively destages modified data from the flash memory device 108 to storage subsystem 120 by buffer 106. The plurality of logical partitions 300 includes a partition (M) 302 that contains modified data to be destaged from the flash memory device 108 to storage subsystem 120.

Data are destaged from one of the plurality of logical partitions 300 with the moving destage pointer 316 by the buffer 106 to the storage subsystem 120 in sequential order. In one embodiment, data does need not be read 116 sequentially in the same chronological order as the data was written 114. For example, using read requests of memory addresses that correspond to an ascending LBA order. Accordingly, only valid data are read 116 and invalid data, from a storage controller perspective, are ignored. For example, the flash memory device 108 treats all data as valid until they are completely overwritten.

In one embodiment, data which have shown repeated overwrites are kept in the flash memory device 108 in order to minimize activity to storage subsystem 120. For example, data with repeated overwrites are written 114 back in the current writing partition 304. A destaging algorithm can choose to select adjacent chunks from more than one partition in order to minimize gaps in the LBAs to be destaged, if there are one or more previously written partitions. Reading 116 the write data from flash memory device 108 and destaging 118 the data to storage subsystem 120 or relocating them to the current writing partition 304 continues until all data in the current destaging partition 310 have been processed.

The just destaged partition 310 will become a writing partition 304. The just destaged partition 310 will become a writing partition 304 as the destage pointer 316 moves down the circular ring of the plurality of logical partitions 300 depending on the number of logical partitions and the write/destage rate. Data in the partition can be used to service read hits and becomes a partition with data previously destaged (E) 306 and 308. The blocks of memory pages in the logical partition previously read 116 from to be destaged 118 will be erased to make room for new data as the write pointer 314 rolls sequentially down the circular ring of the plurality of logical partitions 300.

Data are written 114 to the plurality of logical partitions 300 from the buffer 106 as the writing pointer 314 moves sequentially in the circular ring. For the current writing partition, data are written 114 to the plurality of logical partitions 300 sequentially to take advantage of the high sequential write throughput of the flash memory device 108. Metadata associating the LBA of the write data and its SSD address is maintained at a storage controller level. The metadata for the stale data are marked invalid in the storage controller and the new data are written using a different address.

The writing pointer 314 moves from a write partition 304 to the next partition in the circular ring 306, when the current write partition 304 is full. In one embodiment, at least the first few blocks of memory pages in the next partition should have been erased, allowing writing 114 to continue unimpeded, if the current writing partition 304 is followed by a previously destaged partition 306. In another embodiment, the destaging operation completes before the current writing partition 304 is full to avoid stalling the write operation and time to erase the first block of memory pages in the former destaging partition 306 before the current writing partition is full.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
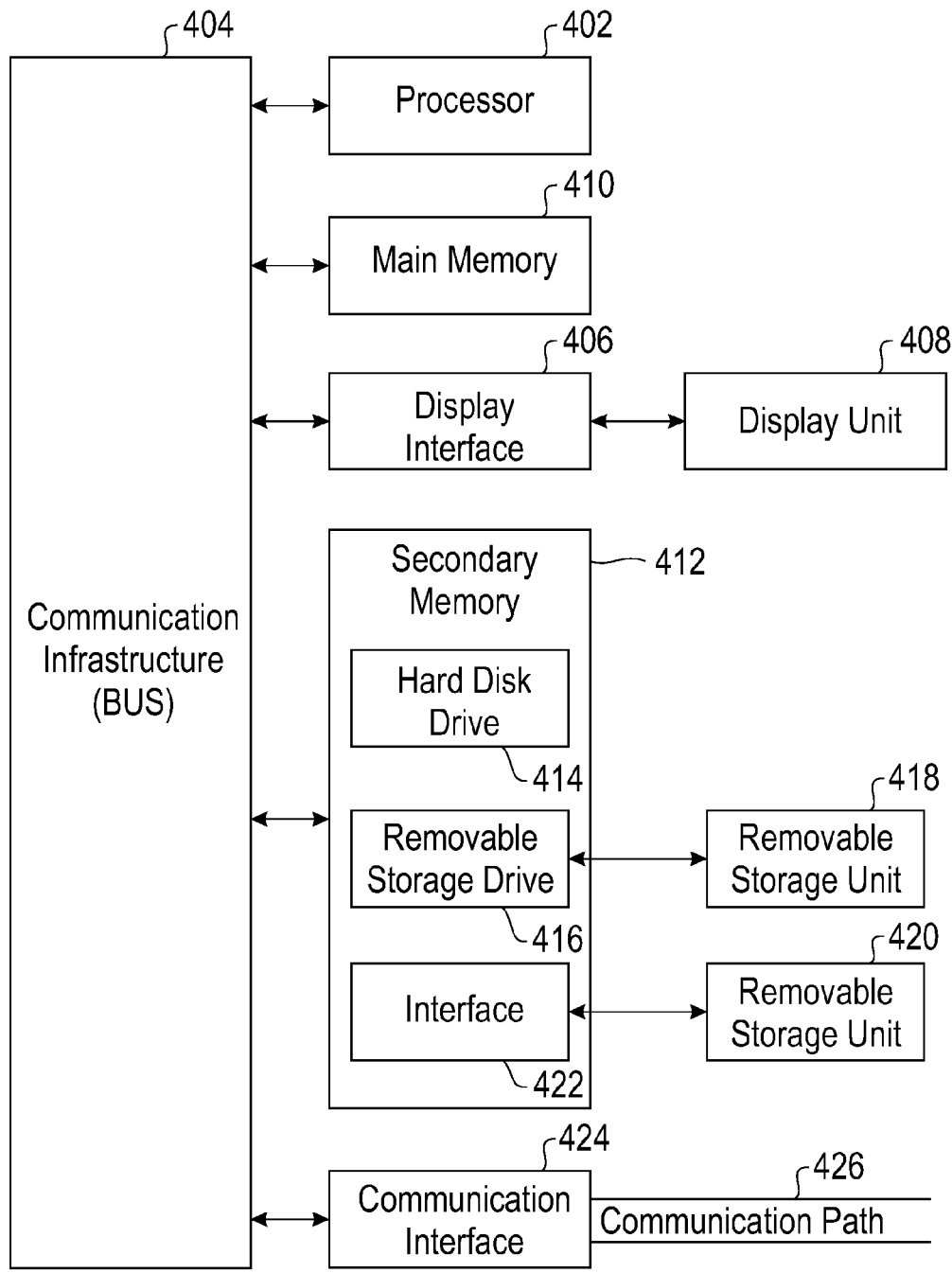
FIG. 4 is a block diagram of a system for implementing an embodiment of the present invention.

FIG. 4 is a block diagram showing system for implementing an embodiment of the present invention. The computer system includes one or more processors, such as a processor 402. The processor 402 is connected to a communication infrastructure 404 (e.g., a communications bus, cross-over bar, or network).

The computer system can include a display interface 406 that forwards graphics, text, and other data from the communication infrastructure 404 (or from a frame buffer not shown) for display on a display unit 408. The computer system also includes a main memory 410, preferably random access memory (RAM), and may also include a secondary memory 412. The secondary memory 412 may include, for example, a hard disk drive 414 and/or a removable storage drive 416, representing, for example, a floppy disk drive, a magnetic tape drive, or an optical disk drive. The removable storage drive 416 reads from and/or writes to a removable storage unit 418 in a manner well known to those having ordinary skill in the art. Removable storage unit 418 represents, for example, a floppy disk, a compact disc, a magnetic tape, or an optical disk, etc., which is read by and written to by removable storage drive 416. As will be appreciated, the removable storage unit 418 includes a computer readable medium having stored therein computer software and/or data.

In alternative embodiments, the secondary memory 412 may include other similar means for allowing computer programs or other instructions to be loaded into the computer system. Such means may include, for example, a removable storage unit 420 and an interface 422. Examples of such means may include a program package and package interface (such as that found in video game devices), a removable memory chip (such as an EPROM, or PROM) and associated socket, and other removable storage units 420 and interfaces 422 which allow software and data to be transferred from the removable storage unit 420 to the computer system.

The computer system may also include a communications interface 424. Communications interface 424 allows software and data to be transferred between the computer system and external devices. Examples of communications interface 424 may include a modem, a network interface (such as an Ethernet card), a communications port, or a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (i.e., channel) 426. This communications path 426 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 410 and secondary memory 412, removable storage drive 416, and a hard disk installed in hard disk drive 414.

Computer programs (also called computer control logic) are stored in main memory 410 and/or secondary memory 412. Computer programs may also be received via a communication interface 424. Such computer programs, when run, enable the computer system to perform the features of the present invention as discussed herein. In particular, the computer programs, when run, enable the processor 402 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A cache, comprising:
a buffer that: buffers data to be cached from a processor, and buffers data to be destaged from cache to a storage subsystem; and
at least one flash memory device coupled to the buffer, the at least one flash memory device: comprising a plurality of logical partitions, wherein each of the plurality of logical partitions is a logical subdivision of one of the at least one flash memory device and comprises a plurality of pages, and caches the data to be cached from the buffer, wherein the cached data are accessible by the processor from the buffer and a location of the cached data within the plurality of logical partitions is accessible by the processor;
wherein data to be destaged to the storage subsystem are read by the buffer from a single logical partition of the plurality of logical partitions until at least all modified data in the single logical partition have been read; and
wherein when the at least all modified data in the single logical partition have been read by the buffer, the single logical partition is made available for erasing data destaged to the storage system and writing new data to be cached.

2. The cache of claim 1, wherein data to be cached to the flash memory device are written to a single logical partition of the plurality of logical partitions until the single logical partition has reached a pre-determined limit.

3. The cache of claim 2, wherein the data to be cached to the flash memory device are written to the plurality of logical partitions in an order selected from the group consisting of: a sequential order of the plurality of logical partitions, an order that begins from a logical partition having a least amount of modified data and that ends with a logical partition having a most amount of modified data, an order that begins from a logical partition having a least amount of data repeatedly accessed by the processor and that ends with a logical partition with a most amount of data repeatedly accessed by the processor, and an order that begins from a logical partition having a least amount of valid data and that ends with a logical partition with a most amount of valid data.

4. The system of claim 1, wherein data to be destaged to the storage subsystem are read by the buffer from the plurality of logical partitions in an order selected from the group consisting of: a sequential order of the plurality of logical partitions, an order that begins from a logical partition having a least amount of modified data and that ends with a logical partition having a most amount of modified data, an order that begins from a logical partition having a least amount of data accessed by the processor and that ends with a logical partition with a most amount of data accessed by the processor, and an order that begins from a logical partition having a least amount of valid data and that ends with a logical partition with a most amount of valid data.

5. The cache of claim 1, wherein data to be destaged to the storage subsystem are read from at least one of the plurality of logical partitions by the buffer in a Logical Block Address order.

6. The cache of claim 5, wherein the data to be destaged to the storage subsystem are read from the plurality of logical partitions selected in an order selected from the group consisting of: an order that begins from a logical partition with data being oldest and that ends with a logical partition with data being newest, an order that begins from a logical partition with a least amount of modified data and that ends with a logical partition with a most amount of modified data, and an order that begins from a logical partition with a least amount of data accessed by the processor and that ends with a logical partition with a most amount of data accessed by the processor.

7. The cache of claim 5, wherein modified pages in the at least one of the plurality of logical partitions that are consecutive to pages being destaged in the at least one of the plurality of logical partitions are: read by the buffer concurrently, and destaged to the storage subsystem concurrently.

8. The cache of claim 1, wherein the flash memory device copies data, which has been accessed by the processor more than once, from a first logical partition of the plurality of logical partitions to a second logical partition of the plurality of logical partitions, and the first logical partition is read for data to be destaged and the second logical partition reads data to be cached from the buffer to the flash memory device.

9. The cache of claim 1, wherein each of the plurality of logical partitions corresponds to a plurality of pages in the at least one flash memory device.

10. The cache of claim 1, further comprising a plurality of flash memory devices coupled to the buffer, wherein data to be cached are written to the plurality of flash memory devices in parallel.

11. The cache of claim 1, wherein data to be cached to the flash memory device are written from the buffer to a first set of the plurality of logical partitions in parallel, and data to be destaged to a storage subsystem are read by the buffer from a second set of the plurality of logical partitions in parallel.

12. The cache of claim 1, wherein data are destaged to the storage subsystem at a varying rate, thereby ensuring sufficient space is available for writing new data to be cached to the flash memory device.

13. A method for reducing write amplification in a cache, comprising:
  partitioning at least one flash memory device in a cache into a plurality of logical partitions, wherein each of the plurality of logical partitions: is a logical subdivision of one of the at least one flash memory device, and comprises a plurality of pages;
  buffering data in a buffer, the data comprising: data to be cached from a processor, and data to be destaged from the cache to a storage subsystem;
  writing the data to be cached from the buffer to the at least one flash memory device;
  providing the processor with: access to the data written to the at least one flash memory device from the buffer, and a location of the data written to the at least one flash memory device within the plurality of logical partitions; and
  destaging the data written to the at least one flash memory device from the buffer to the storage subsystem; and
  wherein data to be cached to the flash memory device are written to a single logical partition of the plurality of logical partitions in an order selected from the group consisting of: a sequential order of the plurality of logical partitions, an order that begins from a logical partition having a least amount of modified data and that ends with a logical partition having a most amount of modified data, an order that begins from a logical partition having a least amount of data repeatedly accessed by the processor and that ends with a logical partition with a most amount of data repeatedly accessed by the processor, and an order that begins from a logical partition having a least amount of valid data and that ends with a logical partition with a most amount of valid data.

14. The method of claim 13, wherein destaging the data from the at least one flash memory device to the storage subsystem comprises:
  reading the data by the buffer from a single logical partition of the plurality of logical partitions in a logical block addressing order, the data read being destaged to the storage subsystem, the single logical partition being read until at least all modified data in the single logical partition have been read; and
  after the at least all modified data in the single logical partition have been read by the buffer and destaged to the storage subsystem, the single logical partition is made available for erasing the data and writing new data to be cached.

15. The method of claim 13, wherein destaging the data from the at least one flash memory device to the storage subsystem comprises:
  reading modified pages in the at least one of the plurality of logical partitions that are consecutive to pages being destaged in one of the plurality of logical partitions by the buffer concurrently, and
  destaging the modified pages from the buffer to the storage subsystem concurrently.

16. A computer program product for reducing write amplification in a cache, the computer program product comprising a non-transitory computer readable storage medium having computer readable program code embodied therewith, the computer readable program code being executable by a computer to:
  partition at least one flash memory device in a cache into a plurality of logical partitions, wherein each of the plurality of logical partitions: is a logical subdivision of one of the at least one flash memory device, and comprises a plurality of pages;
  buffer data in a buffer, the data being: data to be cached from a processor, and data to be destaged from the cache to a storage subsystem;
  write the data to be cached from the buffer to a flash memory device;
  provide the processor with: access to the data written to the at least one flash memory device from the buffer, and a location of the data written to the at least one flash memory device within the plurality of logical partitions; and destage the data from the at least one flash memory device to the storage subsystem;

wherein data to be destaged to the storage subsystem are read by the buffer from the plurality of logical partitions in an order selected from the group consisting of: a sequential order of the plurality of logical partitions, an order that begins from a logical partition having a least amount of modified data and that ends with a logical partition having a most amount of modified data, an order that begins from a logical partition having a least amount of data repeatedly accessed by the processor and that ends with a logical partition with a most amount of data repeatedly accessed by the processor, and an order that begins from a logical partition having a least amount of valid data and that ends with a logical partition with a most amount of valid data.

* * * * *